(12) United States Patent
Gong et al.

(10) Patent No.: US 11,743,921 B2
(45) Date of Patent: Aug. 29, 2023

(54) METHOD FOR DOWNLINK CONTROL CHANNEL DESIGN

(71) Applicant: Huawei Technologies Co., Ltd., Shenzhen (CN)

(72) Inventors: Zhengwei Gong, Ottawa (CA); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/980,314

(22) Filed: Nov. 3, 2022

(65) Prior Publication Data

US 2023/0125414 A1    Apr. 27, 2023

Related U.S. Application Data

(63) Continuation of application No. 15/861,393, filed on Jan. 3, 2018, now Pat. No. 11,523,376.
(Continued)

(51) Int. Cl.
*H04W 72/23* (2023.01)
*H04W 88/02* (2009.01)
(Continued)

(52) U.S. Cl.
CPC ........... *H04W 72/23* (2023.01); *H04L 1/0045* (2013.01); *H04L 1/0075* (2013.01);
(Continued)

(58) Field of Classification Search
CPC ... H04W 72/23; H04W 88/025; H04W 56/00; H04L 1/0045; H04L 1/0075;
(Continued)

(56) References Cited

U.S. PATENT DOCUMENTS

2009/0181712 A1    7/2009    Xu
2011/0269492 A1    11/2011    Wang
(Continued)

FOREIGN PATENT DOCUMENTS

CN    101808408 A    8/2010
CN    101932024 A    12/2010
(Continued)

OTHER PUBLICATIONS

"RAN1 Chairman's Notes," 3GPP TSG RAN WG1 Meeting #87, Nov. 14-18, 2016, 115 pages, Reno, USA.
(Continued)

*Primary Examiner* — Sharmin Chowdhury
(74) *Attorney, Agent, or Firm* — Slater Matsil, LLP

(57) ABSTRACT

Embodiments of this disclosure improve the reliability of blind decoding when beamforming is used by having a user equipment (UE) receive a single downlink control information (DCI) message with different transmission and/or reception parameters. In some embodiments, a UE receives more than one set of configuration parameters, where any two sets of configuration parameters out of the more than one set of configuration parameters have at least one different parameter. The UE may receive two sets of configuration parameters each having a different transmission modes, but the same search space type. Additional examples are also provided.

20 Claims, 13 Drawing Sheets

Related U.S. Application Data

(60) Provisional application No. 62/455,485, filed on Feb. 6, 2017, provisional application No. 62/442,900, filed on Jan. 5, 2017.

(51) Int. Cl.
  H04L 1/00 (2006.01)
  H04L 5/00 (2006.01)
  H04B 7/06 (2006.01)

(52) U.S. Cl.
  CPC ......... H04L 5/0053 (2013.01); H04W 88/025 (2013.01); H04B 7/0617 (2013.01); H04L 1/0038 (2013.01); H04L 5/0007 (2013.01); H04L 5/0023 (2013.01); H04L 5/0069 (2013.01); H04L 5/0091 (2013.01)

(58) Field of Classification Search
  CPC ... H04L 5/0053; H04L 1/0038; H04L 5/0007; H04L 5/0023; H04L 5/0069; H04L 5/0091; H04B 7/0617
  See application file for complete search history.

(56) References Cited

U.S. PATENT DOCUMENTS

| | | |
|---|---|---|
| 2013/0114529 A1 | 5/2013 | Chen et al. |
| 2013/0163551 A1 | 6/2013 | He et al. |
| 2013/0182664 A1 | 7/2013 | Chen et al. |
| 2013/0194956 A1 | 8/2013 | Sartori et al. |
| 2014/0003349 A1 | 1/2014 | Kang et al. |
| 2014/0177582 A1 | 6/2014 | Wu et al. |
| 2014/0254533 A1 | 9/2014 | Kim et al. |
| 2014/0286277 A1 | 9/2014 | Jang et al. |
| 2014/0293942 A1 | 10/2014 | Kang et al. |
| 2015/0029958 A1 | 1/2015 | Park et al. |
| 2015/0358949 A1 | 12/2015 | Oizumi et al. |
| 2016/0014731 A1 | 1/2016 | Li et al. |
| 2016/0242158 A1 | 8/2016 | Takeda et al. |
| 2017/0223738 A1 | 8/2017 | Seo et al. |
| 2017/0332359 A1 | 11/2017 | Tsai et al. |
| 2017/0374569 A1 | 12/2017 | Lee et al. |
| 2018/0115943 A1 | 4/2018 | Park et al. |
| 2018/0139023 A1 | 5/2018 | Li et al. |
| 2018/0183551 A1 | 6/2018 | Chou et al. |
| 2018/0219594 A1* | 8/2018 | Zhang ................ H04L 5/0057 |
| 2019/0013857 A1 | 1/2019 | Zhang et al. |
| 2019/0069314 A1 | 2/2019 | Takeda et al. |
| 2019/0215123 A1 | 7/2019 | Zhou et al. |
| 2019/0238385 A1 | 8/2019 | Yang et al. |
| 2019/0261329 A1 | 8/2019 | Park et al. |
| 2019/0268056 A1 | 8/2019 | Wang et al. |
| 2019/0312679 A1 | 10/2019 | Jayasinghe et al. |
| 2019/0349915 A1 | 11/2019 | Ahn et al. |

FOREIGN PATENT DOCUMENTS

| | | |
|---|---|---|
| CN | 102186251 A | 9/2011 |
| CN | 102291736 A | 12/2011 |
| CN | 102415038 A | 4/2012 |
| CN | 104012159 A | 8/2014 |
| CN | 104067640 A | 9/2014 |
| CN | 104904150 A | 9/2015 |
| CN | 105634667 A | 6/2016 |
| CN | 107113149 A | 8/2017 |
| EP | 2744258 A1 | 6/2014 |
| WO | 2013129883 A1 | 9/2013 |

OTHER PUBLICATIONS

"RAN1 Chairman's Notes," 3GPP TSG RAN WG1 Meeting #86bis, Oct. 10-14, 2016, 113 pages, Lisbon, Portugal.
"RAN1 Chairman's Notes," 3GPP TSG RAN WG1 Meeting #86, Aug. 22-26, 2016, 105 pages, Gothenburg, Sweden.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300, 254 Pages, Jun. 2016, V12.10.0.
LG Electronics, "Discussion on CSS and USS in NR system," 3GPP TSG RAN WG1 Meeting #87, R1-1611837, Nov. 14-18, 2016, 5 pages, Reno, USA.
3GPP TS 36.331 V13.3.0, Release 13, Sep. 2016, 9 Pages.
LTE, "Research and Simulation on Physical Downlink Control Channel in LTE", Harbin Institute of Technology, English Abstract, 2015, 2 Pages.
Qualcomm Incorporated, "DCI design", 3GPP TSG RAN WG1 Meeting #86 bis, R1-1609984, Oct. 10-14, 2016, 3 Pages, Lisbon, Portugal.
ZTE et al., "NR Downlink DCI Design and Procedure", 3GPP TSG RAN WG1 Meeting #87, R1-1611293, Nov. 14-18, 2016, 4 Pages, Reno, USA.

* cited by examiner

| PARAMETERS | PDCCH | | EPDCCH | |
|---|---|---|---|---|
| TRANSMISSION MODE | SFBC | PREDEFINED | SPATIAL MULTIPLEXING | PREDEFINED |
| SEARCH SPACE (SS) TYPE | CSS AND USS | PREDEFINED | USS | PREDEFINED |
| CONTROL CHANNEL MULTIPLEXING | YES | PREDEFINED | N/A | N/A |
| T-F RESOURCE ASSIGNMENT (SET) | FULL BANDWIDTH FOR CSS AND USS | PREDEFINED | ONE OR TWO PRB SET (1,2,4, OR 8 PRB PAIR PER SET) | RRC |
| SCRAMBLING ID | PCI | PREDEFINED | UE-SPECIFIC | RRC |
| REFERENCE SEQUENCE INITIALIZATION | CRS LIKE | PREDEFINED | UE-SPECIFIC | RRC |
| ANTENNA PORT | SAME AS PBCH | PREDEFINED | UE-SPECIFIC | PREDEFINED RULE BASED ON RRC BASED ON MU-MIMO |
| TRANSMISSION SCHEMES OR MAPPING | DISTRIBUTED | PREDEFINED | DISTRIBUTED AND/OR LOCALIZED | RRC |
| MONITOR FOR ONE DCI FOR UNICAST PDSCH | BOTH COMMON AND UE-SPECIFIC FROM PDCCH OR ONLY UE-SPECIFIC FROM EPDCCH (SEARCH SPACE TYPE) | | | |

FIG. 8

METHOD FOR DOWNLINK CONTROL CHANNEL DESIGN

This application is a continuation of U.S. patent application Ser. No. 15/861,393 filed on Jan. 3, 2018, now U.S. Pat. No. 11,523,376 issued on Dec. 6, 2022, and entitled "Method for Downlink Control Channel Design," which claims priority to U.S. Provisional Patent Application No. 62/442,900 filed on Jan. 5, 2017 and entitled "Method for Downlink Control Channel Design" and U.S. Provisional Patent Application No. 62/455,485 filed on Feb. 6, 2017 and entitled "Method for Downlink Control Channel Design," applications of which are incorporated herein by reference as if reproduced in their entireties.

TECHNICAL FIELD

The present disclosure relates generally to telecommunications, and in particular embodiments, to systems and methods for downlink control channel design, which may include Next Radio Physical Downlink Control CHannel (NR-PDCCH) design.

BACKGROUND

Wireless signals communicated at high carrier frequencies, such as millimeter Wave (mmW) signals, tend to exhibit high free-space path loss. To compensate for high path loss rates, high-frequency communications may use beamforming at both the transmitter and receiver. Beam blockage can occur when the transmit (TX) and/or receive (RX) beam directions that are being used for downlink transmission and reception by the base station and user equipment (UE) are not updated to compensate for the condition of the air interface and/or relative positioning of the UE. A beam blockage condition may significantly impact performance when it prevents the UE from decoding downlink control information in a time unit, because the downlink control information may be necessary to locate, and decode, downlink data information in the time unit.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 8 is a table detailing example parameters that may be configured for a downlink control channel;

SUMMARY

Figure 1:
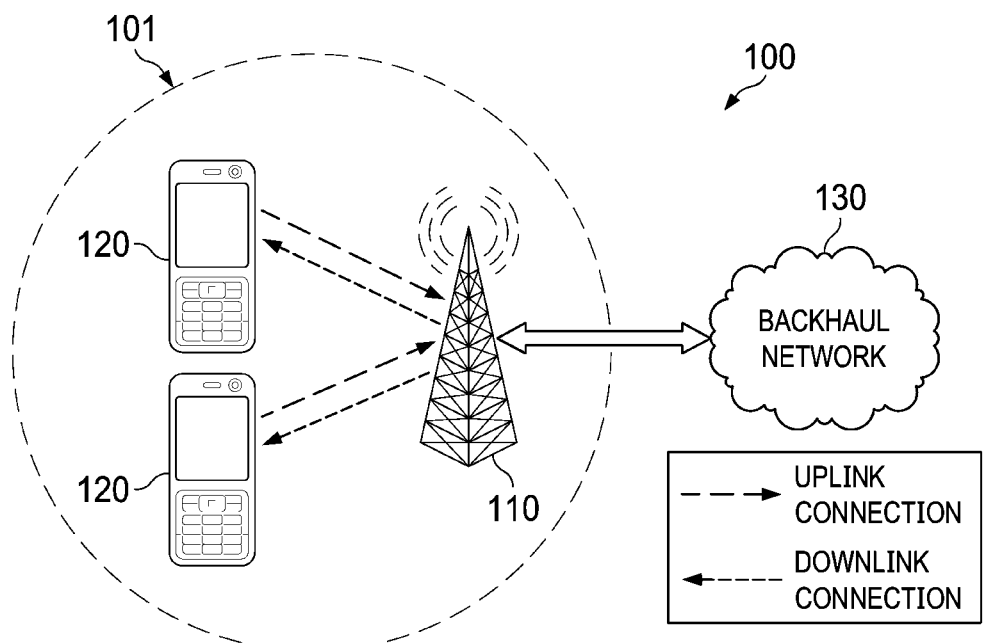
FIG. 1 is a diagram of an embodiment wireless communications network.

Technical advantages are generally achieved, by embodiments of this disclosure which describe techniques for a unifying message to support systems and methods for downlink control channel design.

In accordance with an embodiment, a method for monitoring search spaces is provided. In this embodiment, the method includes receiving a first configuration signaling from a base station, monitoring a first search space for one or more downlink control information (DCI) messages in accordance with first configuration parameters specified by the first configuration signaling, and monitoring a second search space for the one or more DCI messages in accordance with second configuration parameters different from the first configuration parameters. The second configuration parameters are predefined, specified by the first configuration signaling, or specified by a second configuration signaling received by the UE from the base station. In one example, the second configuration parameters are predefined based on synchronization channel over which a synchronization signal is received by the UE from the base station. In that example, or another example, the second configuration parameters are predefined based on the second configuration signaling received by the UE from the base station. In any one of the preceding examples, or in another example, the first configuration parameters and the second configuration parameters each comprises a reference signal (RS) structure, a search space type, one or more aggregation levels, a candidate number, a control resource set, a linkage between different parameters associated with the first or second configuration parameters, or a combination thereof. In such an example, the first configuration parameters may differ from the second configuration parameters with at least one of: the reference signal (RS) structure, the search space type, the one or more aggregation levels, the candidate number, and the control resource set. Additionally or alternatively, the RS structure may specifies a random sequence initialization number, the first configuration signaling may specify a first random sequence initialization number, the second configuration signal may specify a second random sequence initialization number, and the method may further include monitoring the first search space using the first random sequence initialization number, and monitoring the second search space using the second random sequence initialization number. In any one of the preceding examples, or in another example, the first configuration signal specifies a first random sequence initialization number, the predefined configuration parameter set specifies a second random sequence initialization number, and the method may include monitoring the first search space using the first random sequence initialization number, and monitoring the second search space using the second random sequence initialization number.

In any one of the preceding examples, or in another example, the first configuration signaling is radio resource control (RRC) signaling or broadcast signaling. In any one of the preceding examples, or in another example, the first configuration signaling is RRC signaling and the second configuration parameters are specified by the RRC signaling. In any one of the preceding examples, or in another example, the first configuration signaling is broadcast signaling and the second configuration parameters are specified by the broadcast signaling. In any one of the preceding examples, or in another example, the second configuration signaling is RRC signaling. In any one of the preceding examples, or in another example, the first configuration signaling and the second configuration signaling include the same RRC signaling. In any one of the preceding examples, or in another example, any of the first search space or the second search space is a common search space, a UE-specific search space, or a group-specific search space. In any one of the preceding examples, or in another example, the second search space is a different type of search space than the first search space. In any one of the preceding examples, or in another example, the first search space is a common search space or a group-specific search space and the second search space is a UE-specific search space or a group-specific search space. In any one of the preceding examples, or in another example, monitoring the first search space for the one or more DCI messages comprises monitoring the first search space for a first instance of a first DCI message, and monitoring the second search space for the one or more DCI messages comprises monitoring the second search space for a second instance of the first DCI message. In any one of the preceding examples, or in another example, monitoring the first search space for the one or more DCI messages comprises monitoring the first search space for a first instance of a first DCI message, and monitoring the second search space for the one or more DCI messages comprises monitoring the second search space for a first instance of a second DCI message, where the first DCI message and the second DCI message are associated with the same RNTI or UE ID. An apparatus for performing this method is also provided.

In accordance with another embodiment, a method for configuring search spaces is provided. In this embodiment, the method includes transmitting a first configuration signal to a user equipment (UE) that instructs the UE to monitor a first search space according to first configuration parameters. The UE is configured to monitor a second search space according to second configuration parameters that are predefined, specified by the first configuration signaling, or specified by a second configuration signaling received by the UE from the base station. An apparatus for performing this method is also provided.

In accordance with yet another embodiment, another method for monitoring search spaces is provided. In this embodiment, the method includes monitoring multiple search spaces for a downlink control information (DCI) message using different receive beams of the UE. In one example, the multiple search spaces comprise at least two of a common search space, a UE-specific search space, and a UE group-specific search space, where the common search space is configured with predefined information or control signaling transmitted over a broadcast channel, the UE-specific search space is configured with UE-specific control signaling transmitted over a unicast channel, and the UE group-specific search space is configured with group specific information and UE-specific control signaling transmitted over a unicast channel. In the same example, or another example, the multiple search spaces being monitored by the UE include at least two search spaces having different transmission modes. In any one of the preceding examples, or in another example, the multiple search spaces being monitored by the UE include at least two search spaces having different reference signal configurations. In any one of the preceding examples, or in another example, the multiple search spaces being monitored by the UE include two search spaces transmitted over different carrier frequencies or cells. In any one of the preceding examples, or in another example, the multiple search spaces being monitored by the UE include search spaces transmitted in accordance with different aggregation levels. In any one of the preceding examples, or in another example, the multiple search spaces being monitored by the UE include search spaces having different indication modes. In any one of the preceding examples, or in another example, different instances of the DCI message are transmitted in two or more different search spaces being monitored by the UE. In any one of the preceding examples, or in another example, the UE monitors the multiple search spaces after receiving a configuration signaling that instructs the UE to monitor multiple search spaces. An apparatus for performing this method is also provided.

DETAILED DESCRIPTION OF ILLUSTRATIVE EMBODIMENTS

The structure, manufacture and use of embodiments provided herein are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure. The term "beam direction" refers to a radio antenna pattern, or set of beamforming weights, that is used for directional signal transmission and/or reception. The terms "beam directions" and "beams" are used interchangeably herein.

Downlink control information (DCI) messages are typically decoded by the UE through a process referred to as blind decoding. Blind decoding reduces network overhead by allowing UEs to detect which set of control channel elements (CCEs) in a physical downlink control channel (PDCCH) carry a DCI message for the UE without having to send explicit control signaling. In general, a UE performs blind decoding in a search space of a physical downlink control channel (PDCCH) by attempting to decode different candidate sets of control channel elements (CCEs) until one of the decoding attempts is successful. For example, a UE may first attempt to blindly decode the first CCE in a search space. If that decoding attempt is unsuccessful, then the UE may attempt to decode the first two CCEs in the search space, then the first four CCEs in the search space, and so on and so forth until a decoding attempt is successful. The UE attempts to blindly decode a specific candidate set of CCEs by using the UE's identifier in the network, for example, a radio network temporary identifier (RNTI), to demask a cyclic redundancy check (CRC) of the candidate set of CCEs. If no CRC error is detected, then the decoding attempt is successful, and the UE processes the set of CCEs to decode a DCI message. In some embodiments, blind decoding is performed on a first search space type of multiple search space types being monitored by the UE. The UE may be configured to decode a single DCI, multiple instances of a single DCI, multiple DC or multiple instances of multiple DCI. The UE may not attempt to blindly decode remaining search space types if the UE successfully decodes the DCI message, or messages, when performing blind decoding on the first search space type.

When beamforming is used, blind detection may become less reliable because a beam blockage condition may prevent a UE from successfully decoding a DCI message in the search space. This may significantly impair performance because the UE's failure to correctly decode a DCI message in the control channel of a time unit may likewise prevent the UE from locating, and decoding, data in a data channel of the time unit, thereby potentially requiring re-transmission of the data in a subsequent time unit.

Embodiments of this disclosure improve the reliability of blind decoding when beamforming is used by having the UE receive a single downlink control information (DCI) message with different transmission and/or reception parameters. The term "transmission and/or reception parameters" refers to one or more parameters used for Next Radio Physical Downlink Control CHannel (NR-PDCCH) to transmit and/or receive one DCI message, such as, but not limited to, a transmission mode used to transmit the DCI message, a reference signal (RS) structure used for channel estimation for the DCI message; a reception beam related to a beam pair link which can be switched to receive the DCI message; a search space type to be monitored to receive the DCI message, a candidate number and an aggregation level for search space definition; a control resource set used to map the DCI message and a configuration set index used to identify the configured parameters. The relation between different parameters from one set of parameters configured for NR-PDCCH can be regarded as an association or a linkage. For example, a relationship between search space type and one control resource set (T-F resource assignment) is configured within one control channel configuration.

The transmission mode may be a diversity mode, such as diversity precoding (e.g. space frequency block coding, SFBC and precoding switching/cycling) or spatial multiplexing.

Reference signal (RS) structure may comprise at least one parameter out of signaling method, random sequence initialization number, time/frequency resource and antenna port number and/or index wherein signaling method could be predefined, broadcasting channel or dedicated channel; random sequence initialization number can be cell ID or some other configured ID; time/frequency resource can be OFDM symbol index and/or subcarrier carrier index; and antenna port number and/or index can be the number and/or index of antenna port.

The reception beam may comprise at least one parameter such as reception beam index and/or time unit associated with the specific beam index. The time unit comprises one of an OFDM symbol, an OFDM symbol group, a mini-slot, a slot and a subframe. For multiple instances of a single DCI messages and/or multiple DCI messages, the reception beam for each instance includes a reception beam index and a time unit for the respective reception beam index.

The search space type could be one of Common Search Space (CSS) or UE-group search space (UGSS) that is for receipt by multiple UEs or a UE-specific Search Space (USS) that is specific to a single UE. A common search space may be either a preconfigured search space or a search space configured via control signaling transmitted over a broadcast channel, UE-specific and group-specific search spaces may be configured via UE-specific and group-specific control signaling (respectively) transmitted over a unicast channel.

Time/frequency resource set assignment (i.e. control resource set) is defined as a set of Resource Element Groups (REGs) under a given numerology. In some implementations a REG is four consecutive Resource Elements (RE). An RE is a smallest transmission resource element, which may, for example, be a 1 symbol by 1 sub-carrier.

A control search space for one search space type may be defined by at least some of the following properties: one or more aggregation levels, a number of decoding candidates for each aggregation level and a set of Control Channel Elements (CCEs) for each decoding candidate. A candidate is a location in the search space that may include downlink control information for the UE. In some implementations, a CCE may be nine consecutive REGs. An Aggregation may be 1, 2, 4, or 8 consecutive CCEs. As an example, an aggregation level of 2 would be 2 consecutive CCEs.

In some embodiments, a UE receives more than one set of configuration parameters, wherein any two sets of configuration parameters out of the more than one set of configuration parameters have at least one different parameter. In a first example, the UE receives two sets of configuration parameters each having a different transmission modes, but the same search space type. In a second example, the UE receives two sets of configuration parameters each having a different search space type, but the same transmission mode. In a third example, the UE receives two sets of configuration parameters each having a different search space type, but the same control resource set. In a fourth example, the UE receives two sets of configuration parameters each having a different control resource set, but the same search space type. In a fifth example, the UE receives two sets of configuration parameters each having a different reception beam, but the same search space type. In some embodiments, the UE receives more than one set of configuration parameters wherein at least one of the parameters of any set of the more than one set of configuration parameters can be configured by predefining the at least one parameters, transmitting the at least one parameters with a broadcasting channel and transmitting the at least one parameters with a dedicated channel. Once a UE is configured with multiple control channel configuration sets, the network can transmit downlink control channel configuration information in a manner that is consistent with one or more of the configurations. The UE can attempt to blind decode the control information as described above based on the various configurations that it is configured with.

In some embodiments, the UE receives one DCI message using more than one transmission mode, which could be diversity precoding (e.g. space frequency block coding (SFBC) or precoding switching/cycling) or spatial multiplexing. In one example, one instance of one DCI message can be transmitted with only one of more than one transmission mode (e.g. SFBC) while the UE will use more than one transmission mode to receive the one DCI message. In another example, more than one instance of one DCI message can be transmitted each with a different transmission mode (e.g. SFBC and spatial multiplexing) while the UE will use more than one transmission mode to receive at least one instance of the one DCI message. For these embodiments, the UE can be configured to monitor multiple search space types which are associated with different transmission modes to receive the one DCI message.

Embodiments of this disclosure improve the reliability of blind decoding when beamforming is used by having the UE monitor multiple search spaces for a single downlink control information (DCI) message. The multiple search spaces being monitored by the UE may be orthogonal in the time domain and/or the frequency domain. In some embodiments, the multiple monitored search spaces include different types of search spaces. In one example, the multiple monitored search spaces include at least two of a common search space, a UE-specific search space, and a group-specific search space.

In some embodiments, the UE receives one DCI message using more than one RS structure with different parameters including at least one of signaling method, random sequence initialization number, time/frequency resource and antenna port number and/or antenna port index. The signaling method may be predefined, transmitted on a broadcasting channel or transmitted on a dedicated channel. For a first example, one instance of one DCI message can be transmitted with only one RS structure that is indicated with a broadcasting channel while the UE will use more than one RS structure with different signaling methods (broadcasting channel or dedicating channel) to receive the one DCI message. For a second example, one instance of one DCI message can be transmitted with only one RS structure with a cell ID as a random sequence initialization number while the UE will use more than one RS structure with different random sequence initialization numbers (cell ID and other configured ID) to receive the one DCI message. For a third example, a UE may monitor a first search space for DCI message(s) in accordance with random sequence initialization number specified by broadcast signaling, and monitor a second search space for DCI message(s) in accordance with random sequence initialization number specified by RRC signaling. For a fourth example, a UE may monitor a first search space for DCI message(s) in accordance with random sequence initialization number predefined (or pre-associated) with a cell identifier (ID) corresponding to the synchronization channel over which the synchronization signal was received from the base station, as well as monitor a second search space for at least one DCI message in accordance with random sequence initialization number specified by the RRC signaling. In either one of those embodiments, the second search space may be a different type of search space than the first search space. For example, the first search space may be a common search space and the second search space may be a UE-specific search space. The broadcast signaling may be system information block (SIB) signaling.

In some embodiments, the UE uses different receive (RX) beam directions to sample different search space types. In some embodiments, the UE uses different receive (RX) beam directions to sample multiple different control resource sets associated with the same search space type. In some embodiments, the UE may use multiple RX beam directions to sample one control resource set. For example, one control resource set comprises multiple time units which could be at least one of one OFDM symbol, an OFDM symbol group, a mini-slot, a slot and a subframe. According to the index of time unit and configured reception beam index for this time unit, the UE switches the reception beam to receive one DCI message.

In some embodiments, the UE can receive multiple repeated instances of one DCI message wherein multiple instances can be mapped across multiple search space types and/or control resource sets. In one example, multiple instances can be mapped across multiple search space types while each space type is associated with a specific control resource set. In another example, multiple instances can be mapped across multiple control resource sets associated with one search space type. In another example, multiple instances can be mapped across multiple control resource sets associated with more than one search space type. The number of repeated instances can be explicitly indicated or implicitly indicated, for example, as a number of different search space types that are configured to be monitored or as a number of all control resource sets configured to be monitored. In all embodiments, multiple decoded DCI message can be combined for a robust decoding for one DCI message wherein each instance can be independently decoded for one DCI message.

In some embodiments, the UE can receive more than one DCI message with same UE ID or RNTI wherein more than one DCI message can be received with different transmission and/or reception parameters including at least one of transmission mode, reference signal (RS) structure, reception beam, search space type and control resource set.

In an embodiment, a UE may monitor a first search space for DCI message(s) in accordance with configuration parameters specified by broadcast signaling, and monitor a second search space for DCI message(s) in accordance with configuration parameters specified by RRC signaling. In another embodiment, a UE may monitor a first search space for DCI message(s) in accordance with configuration parameters pre-associated with a cell identifier (ID) corresponding to the synchronization channel over which the synchronization signal was received from the base station, as well as monitor a second search space for at least one DCI message in accordance with configuration parameters specified by the RRC signaling. In either one of those embodiments, the second search space may be a different type of search space than the first search space. For example, the first search space may be a common search space and the second search space may be a UE-specific search space. The broadcast signaling may be system information block (SIB) signaling.

Downlink control information (DCI) messages are typically decoded by the UE through a process referred to as blind decoding. Blind decoding reduces network overhead by allowing UEs to detect which set of control channel elements (CCEs) in a physical downlink control channel (PDCCH) carry a DCI message for the UE without having to send explicit control signaling. In general, a UE performs blind decoding in a search space of a physical downlink control channel (PDCCH) by attempting to decode different candidate sets of control channel elements (CCEs) until one of the decoding attempts is successful. For example, a UE may first attempt to blindly decode the first CCE in a search space. If that decoding attempt is unsuccessful, then the UE may attempt to decode the first two CCEs in the search space, then the first four CCEs in the search space, and so on and so forth until a decoding attempt is successful. The UE attempts to blindly decode a specific candidate set of CCEs by using the UE's identifier in the network, for example, a radio network temporary identifier (RNTI), to demask a cyclic redundancy check (CRC) of the candidate set of CCEs. If no CRC error is detected, then the decoding attempt is successful, and the UE processes the set of CCEs to decode a DCI message.

When beamforming is used, blind detection may become less reliable because a beam blockage condition may prevent a UE from successfully decoding a DCI message in the search space. This may significantly impair performance because the UE's failure to correctly decode a DCI message in the control channel of a time unit may likewise prevent the UE from locating, and decoding, data in a data channel of the time unit, thereby potentially requiring re-transmission of the data in a subsequent time unit.

Embodiments of this disclosure improve the reliability of blind decoding when beamforming is used by having the UE monitor multiple search spaces for a single downlink control information (DCI) message. The search spaces may have different resource configurations to provide frequency and/ or spatial diversity, thereby improving the likelihood that the DCI message will be successfully decoded. The term "resource configuration" refers to one or more parameters used to configure a search space, such as (for example) time/frequency resources (e.g., physical resource block (PRBs) mapped to the search space, frequency carrier used to transmit the search space, a cell associated with the search space, an antenna port associated with the search space, a beam direction used to transmit or sample the search space, a transmission mode associated with the search space, a number of reference signals in the search space, the locations of reference signals in the search space, and CCE aggregation levels associated the search space. In one embodiment, a single instance of a DCI message is transmitted in one of the monitored search spaces. In another embodiment, multiple instances of a DCI message are transmitted in different search spaces to provide the UE with multiple opportunities to decode the DCI message. In both embodiments, the UE may sample all search spaces being monitored by the UE, and then blindly decode a first one of the sampled search spaces in an attempt to decode the DCI message. If the UE is able to decode the DCI message, then the UE may use the DCI message to decode a corresponding data transmission using the DCI message without blindly decoding any of the other search spaces. Alternatively, if the UE is unable to successfully decode the DCI message when blindly decoding the first search space, then the UE may blindly decode another one of the sampled search spaces. This may continue until the UE either decodes the DCI message, or fails to decode a DCI message after blindly decoding all sampled search spaces.

In some embodiments, the UE uses different receive (RX) beam directions to sample different search spaces. In some embodiments, multiple beams may be used to sample the same search space. The UE may select the RX beam direction to use for a given search space based on a resource configuration associated with the search space. In some embodiments, the base station transmits different instances of a given DCI message using different TX beam directions to reduce the likelihood of beam blockage on the transmitter side.

In some embodiments, search spaces with different resource configurations can be used to transmit different instances of the same DCI message. In one example, a search space configured with space frequency block coding (SFBC) may be used to transmit one instance of a DCI message and a search space configured with a spatial multiplexing may be used to transmit another instance of the DCI message. The instances of the DCI message may be transmitted over both search spaces simultaneously. Alternatively, the DCI message may be re-transmitted over the SFBC-configured search space when an earlier transmission of the DCI message over the spatial multiplexing-configured search space was unsuccessful, or vice versa. In another example, search spaces having different beam (pair) configurations may be used to transmit instances of the same DCI message. The transmission of the DCI message over the search spaces having different beam (pair) configurations should be based on TDM (time division multiplexing). Alternatively, the DCI message may be retransmitted over one of the beam (pair)-configured search spaces when an initial transmission over the other beam (pair)-configured search space was unsuccessful.

The multiple search spaces being monitored by the UE may be orthogonal in the time domain and/or the frequency domain. In some embodiments, the multiple monitored search spaces include different types of search spaces. In one example, the multiple monitored search spaces include at least two of a common search space, a UE-specific search space, and a group-specific search space. A common search space may be either a preconfigured search space or a search space configured via control signaling transmitted over a broadcast channel, UE-specific and group-specific search spaces may be configured via UE-specific and group-specific control signaling (respectively) transmitted over a unicast channel.

As mentioned above, the monitored search spaces may have different resource configurations. In one example, the search spaces have different transmission modes. In another example, the search spaces may contain different reference signal configurations. For instance, the search spaces may include different types of reference signals (e.g., cell specific reference signal (CRS), demodulation reference signal (DMRS), etc.), different numbers of reference signals, and/ or carry the reference signals over different resources (e.g., different time, frequency and antenna ports, etc.). In yet another example, one of the search spaces may utilize localized resource mapping (e.g., CCEs span consecutive time/frequency resources), and the other search space may use distributed resource mapping (e.g., CCEs span non-consecutive time/frequency resources based on a hopping/ interleaving pattern). In yet another example, the search spaces may be pre-configured and/or configured using different control signaling indications, e.g., cell-specific control signaling, UE specific radio resource channel (RRC) control signaling, etc. In yet another example, the search spaces may be transmitted over different carrier frequencies. In such an example, one search space may be transmitted over a high carrier frequency (e.g., mmWave carrier frequency) and the other search space may be transmitted over a low carrier frequency (e.g., between 1.4 and 20 MegaHertz (MHz), etc.). In yet another example, the search spaces may be transmitted over different physical control channels. For instance, one search space may be transmitted over a physical downlink control channel (PDCCH), and another search space may be transmitted over an enhanced PDCCH (ePDCCH). In yet another example, the search spaces may be transmitted according to different CCE aggregation levels. For example, a UE may attempt to blindly decode one search space using, for example, CCE aggregation level one and two, and then attempt to blindly decode another search space using CCE aggregation level four. Other examples are possible. For instance, the UE may attempt to blindly decode one search space using each CCE aggregation level in a set of CCE aggregation levels (e.g., CCE aggregation levels one, two, four, and eight), and then attempt to blindly decode another search spaces using a subset of CCE aggregation levels (e.g., CCE aggregation levels four and eight). These and other aspects are discussed in greater detail below.

In some embodiments, search spaces being monitored by a UE have different transmission modes. For example, search spaces being monitored by a UE may have different antenna port configurations. As another example, search spaces being monitored by a UE may have different layer mappings with respect to spatial multiplexing such that different numbers of space-time streams are used to transmit a DCI message in the respective search spaces. As another example, search spaces being monitored by a UE may have different layer mappings with respect to transmit diversity such that different numbers of antennas are used to transmit a given symbol in the respective search spaces.

FIG. 1 is diagram of a network 100 for communicating data. The network 100 comprises a base station 110 having a coverage area 101, a plurality of user equipments (UEs) 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an enhanced Node B (eNB), a transmit/receive point (TRP), a macro-cell, a femtocell, a Wi-Fi access point (AP), and other wirelessly enabled devices. Base stations may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2A:
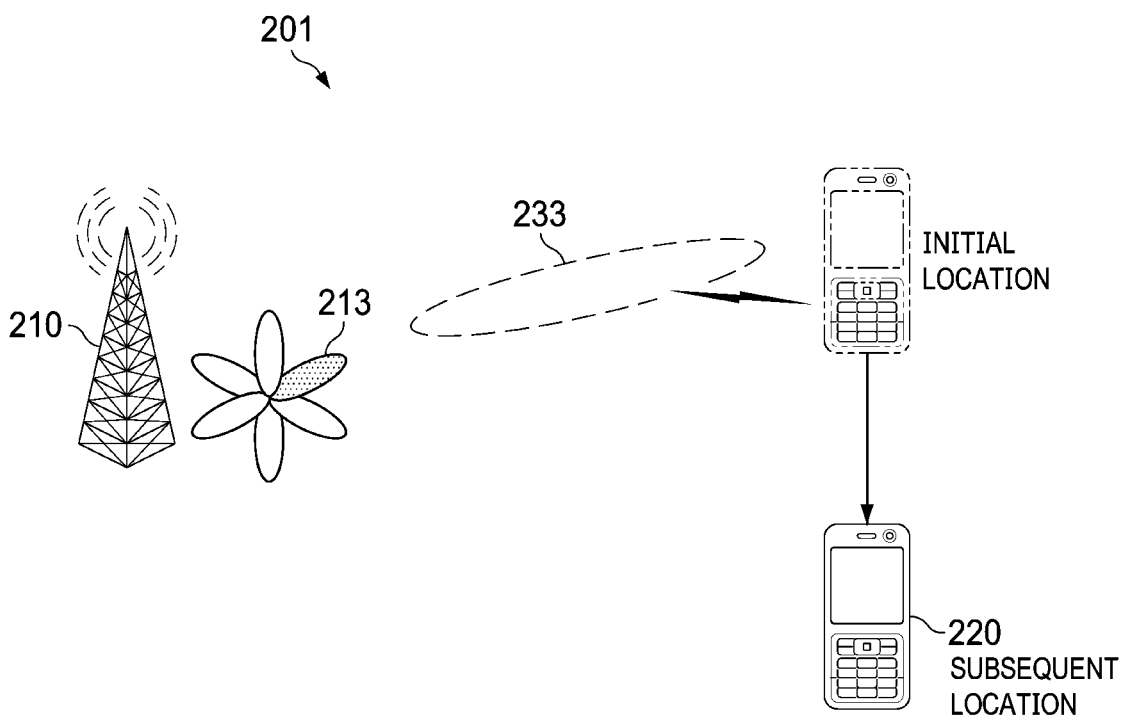
FIGS. 2A and 2B are diagrams of how a beam blockage condition can occur when beamforming is used to transmit or receive a Downlink Control Information (DCI) message.
Figure 2B:
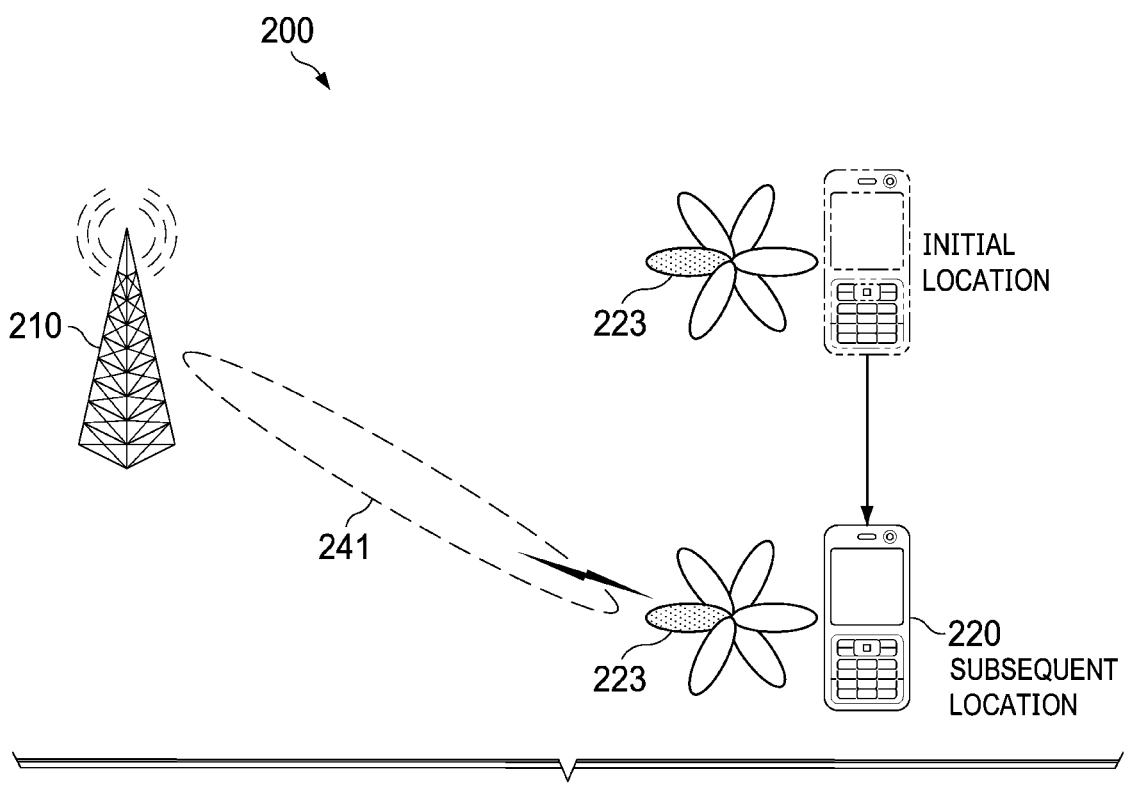

When beamforming is used to transmit and/or receive a DCI message, DCI detection may become less reliable due to the potential for beam blockage. FIGS. 2A and 2B are diagrams of DCI transmission and/or reception schemes 201, 202 that show how a beam blockage condition can occur which a DCI message is transmitted from a base station 210 to a UE 220.

In FIG. 2A, the base station 210 selects a beam direction 213 via a beam scanning or beam tracking procedure when the UE 220 is positioned in an initial location, and then transmits a DCI message 233 based on the beam direction 213. The UE 220 migrates from the initial location to a subsequent location prior to transmission of the DCI message 233. The received signal/quality level of the DCI message 233 at the subsequent location is not sufficient to allow the UE 220 to blindly decode the DCI message 233, thereby resulting in a beam blockage condition.

In FIG. 2B, the UE 220 selects a beam direction 223 via a beam scanning or beam tracking procedure when the UE 220 is positioned in an initial location. The UE 220 migrates from the initial location to a subsequent location prior to transmission of a DCI message 241 by the base station 210. The spatial performance of the beam direction 223 is not sufficient to allow the UE 220 to blindly decode the DCI message 241, which causes a beam blockage condition to occur.

Figure 3A:
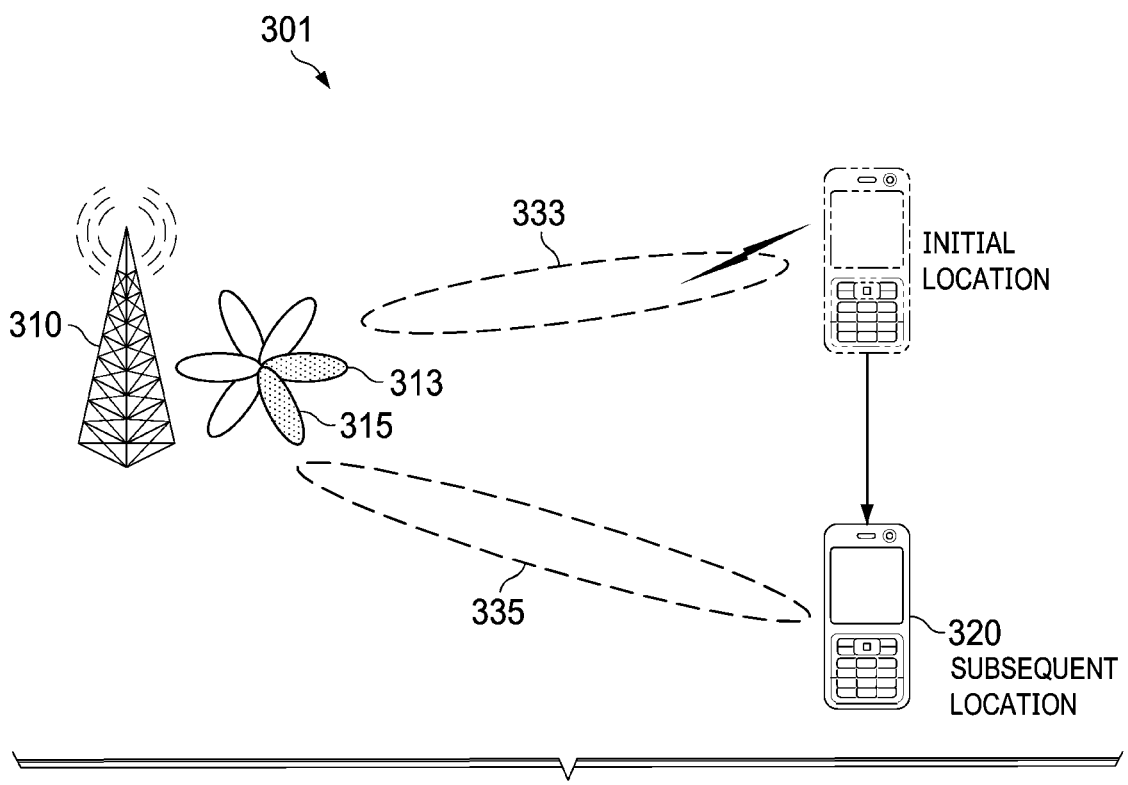
FIGS. 3A and 3B are diagrams of embodiment DCI transmission and reception schemes that use multiple transmit (TX) and receive (RX) beam directions.
Figure 3B:
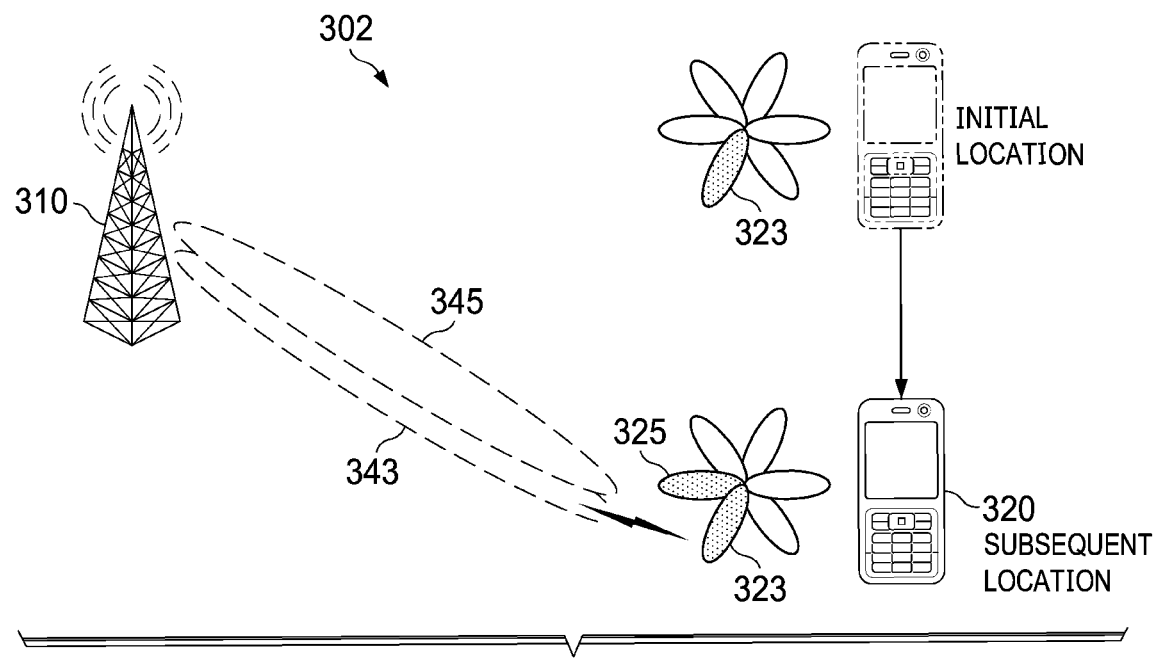

Embodiments of this disclosure improve the reliability of blind decoding by transmitting multiple instances of a DCI message in different search space types of a time unit. FIGS. 3A and 3B are diagrams of embodiment DCI transmission schemes 301, 302 that mitigate beam blockage by transmitting multiple instances of a DCI message in different search spaces of a time unit.

In FIG. 3A, a base station 310 selects a beam direction 313 via a beam-scanning or beam-tracking procedure when the UE 320 is in an initial location, and then transmits one instance of a DCI message 333 over the beam direction 313 and another instance of the DCI message 335 over a beam direction 315. The UE 320 migrates from the initial location to a subsequent location prior to transmission of the instance of the DCI message 333, 335. In this example, the beam direction 315 has a boresight that is offset from the boresight of the beam direction 333. As a result, the instant of the DCI message 335 transmitted over the beam direction 315 has a better received signal power or quality level than the instance of the DCI message 333 transmitted over the beam direction 313, and the UE 320 is able to blindly decode the instance of the DCI message 335.

In FIG. 3B, the UE 320 selects a beam direction 323 via a beam-scanning or beam-tracking procedure when the UE 320 is positioned in an initial location. The UE 320 then migrates from the initial location to a subsequent location. Thereafter, the base station 310 transmits two instances of a DCI message 343, 345 in different search spaces of a time unit. The instances of the DCI message 343, 345 may be omnidirectional transmissions. Alternatively, the instances of the DCI message 343, 345 may be beamformed transmissions that are transmitted in the same beam direction, or different beam directions. In this example, the UE 320 attempts to blindly decode the search space carrying the DCI message 343 using the beam direction 323. The spatial performance of the beam direction 323 at the subsequent location is not sufficient to allow the UE 320 to blindly decode the DCI message 343. The UE 320 then attempts to blindly decode the search space carrying the DCI message 345 using the beam direction 325. The spatial performance of the beam direction 325 is sufficient to allow the UE 320 to blindly decode the DCI message 345.

Although only two instances of the DCI message are depicted as being transmitted in the embodiment DCI transmission schemes 301, 302, it should be appreciated that other embodiment DCI transmission schemes may transmit three or more instances of a DCI message in different search spaces of a time unit.

Figure 4:
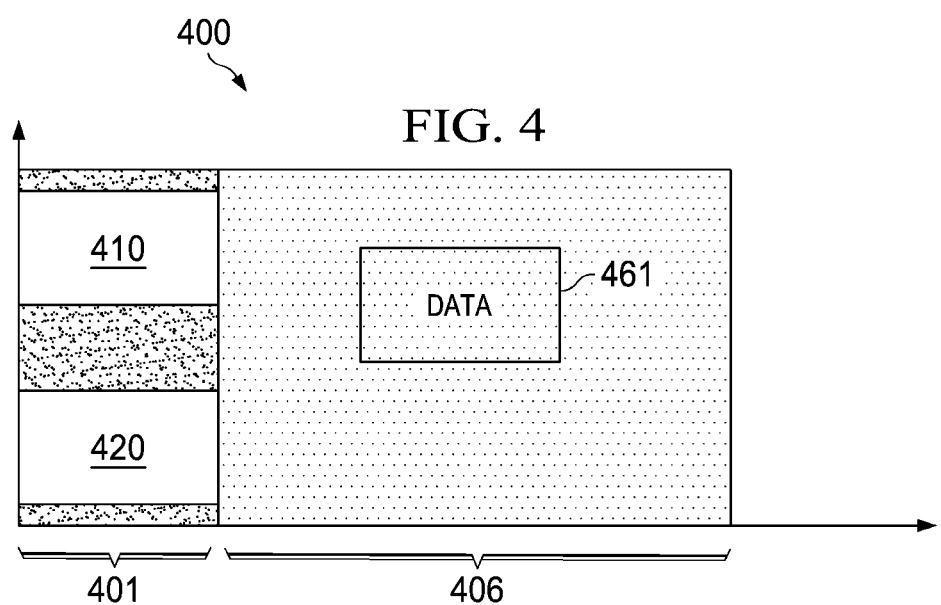
FIG. 4 is a diagram of a downlink time unit carrying multiple search spaces that are monitored by a UE in an attempt to decode a single DCI message.

Search spaces being monitored by a UE may be multiplexed in the frequency domain. FIG. 4 is a diagram of a downlink time unit 400 carrying multiple search spaces 410, 420 that are monitored by a UE in an attempt to decode a single DCI message. In this example, the search spaces 410, 420 are frequency division multiplexed. In some embodiments, a single instance of a DCI message may be transmitted in one of the search spaces 410, 420. In another embodiment, one instance of a DCI message is transmitted in the search spaces 410, and another instance of the DCI message is transmitted in the search space 420.

Figure 5:
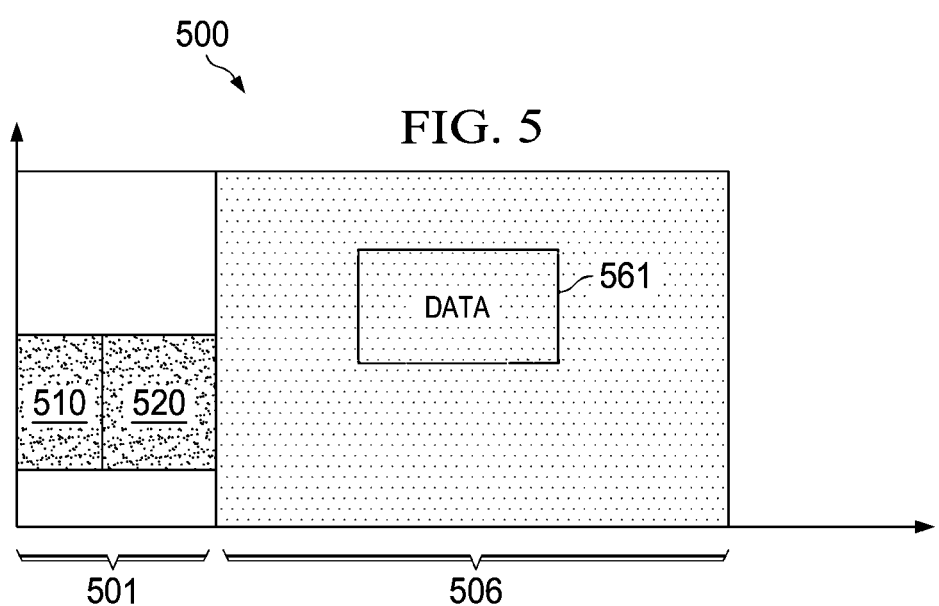
FIG. 5 is a diagram of another downlink time unit carrying multiple search spaces that are monitored by a UE in an attempt to decode a single DCI message.

Search spaces being monitored by a UE may also be multiplexed in the time domain. FIG. 5 is a diagram of a downlink time unit 500 carrying multiple search spaces 510, 520 that are monitored by a UE in an attempt to decode a single DCI message. In this example, the search spaces 510, 520 are time division multiplexed. A single instance of a DCI message may be transmitted in one of the search spaces 510, 520. Alternatively, different instances of a DCI message may be transmitted in the search spaces 510, 520. The search spaces 510, 520 may have different resource configurations and/or may be received using different RX beam directions.

Figure 6:
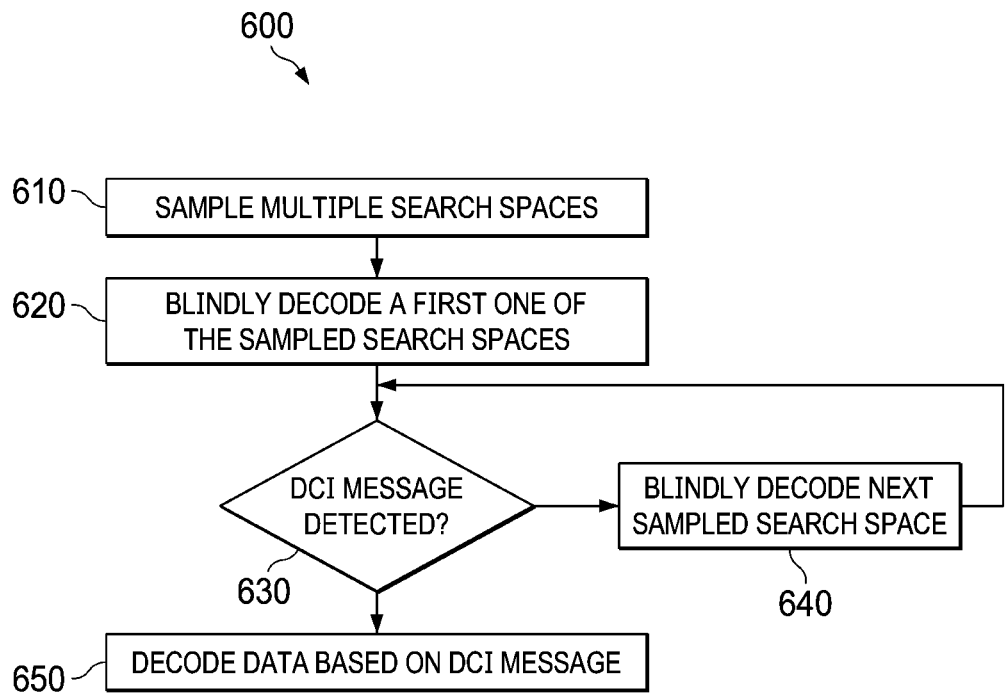
FIG. 6 is a flowchart of an embodiment method for monitoring multiple search spaces.

FIG. 6 is a flowchart of an embodiment method 600 for monitoring multiple search spaces for a single DCI message, as may be performed by a UE. At step 610, the UE samples multiple search spaces. At step 620, the UE blindly decodes a first one of the sampled search spaces. At step 630, the UE determines whether a DCI message has been decoded. If not, the UE determines whether any additional search spaces are left to blindly decode at step 640, and if so, blindly decodes the next sampled search space at step 640 prior to returning to step 630. If the UE blindly decodes all sampled search spaces without decoding the DCI message, then the UE sends an error message to the base station at step 660. If the UE decodes the DCI message in one of the sampled search spaces, then the UE decodes data based on the DCI message at step 670.

Figure 7:
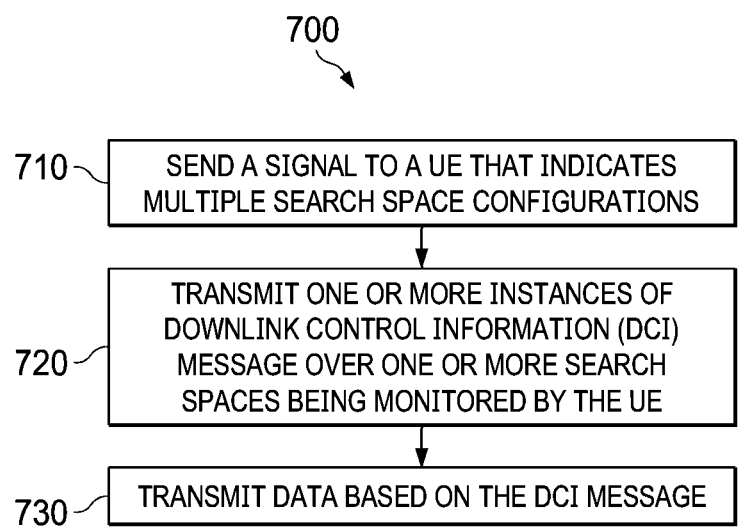
FIG. 7 is a flowchart of an embodiment method for configuring a UE to monitor multiple search spaces.

FIG. 7 is a flowchart of an embodiment method 700 for configuring a UE to monitor multiple search spaces for a DCI message, as might be performed by a base station. At step 710, the base station sends a signal to a UE that indicates multiple search space configurations. The signal may prompt the UE to monitor multiple search spaces for a single DCI message. At step 720, the base station transmits one or more instances of a DCI message over one or more of the multiple search spaces being monitored by the UE. At step 730, the base station transmits data based on the DCI message.

FIG. 8 is a table that illustrates an example of types of parameters that may be involved in defining a physical downlink control channel that the UE would need to be configured for to receive the information transmitted on the downlink control channel. The parameters shown in FIG. 8 are merely examples of possible parameters. In other implementations, a select subset of the parameters shown in FIG. 8 may make up the configuration set of parameters, or a group of any of these parameters and other additional parameters may make up the set.

Figure 9:
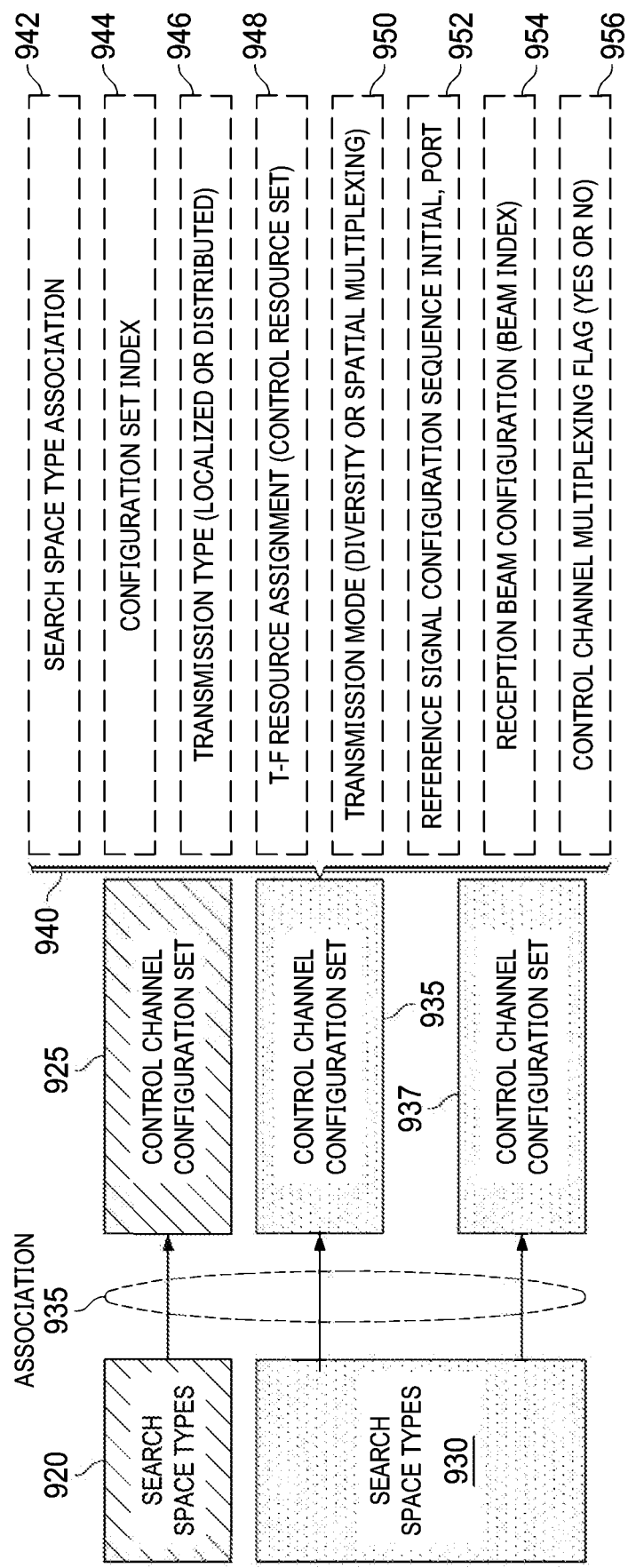
FIG. 9 is a block diagram illustrating a relationship between search space types and one or more control channel configurations sets associated therewith.

FIG. 9 illustrates an example of how a search space type, for example a USS or a CSS, may have one or more different control channel configuration sets of parameters and how the control channel configuration sets may be associated.

A first search spaces type 920 is associated with a single set of control channel configuration parameters 925. A second search space type 930 is associated with two control channel configuration sets of parameters 935 and 937. The two different search space types 920 and 930 are indicated to be associated with one another. The association of search space types may act essentially like an index to simply define a combination of which search space types are being used when more than one search space type is being used by a UE.

A list of configuration parameters 940 are also shown as example types of parameters that are found in configuration set 935. The list 940, pointing in particular to set 935, is intended to merely be an example of the parameters that are in any given set of parameters, and are not intended to be limited to only this set of parameters.

The parameters in the list 940 are generally consistent to what is shown in FIG. 8. List 940 includes a search space type association 932, a configuration set index 944, a transmission type (for example localized or distributed) 946, a T-F resource set assignment (a control resource set) 948, a transmission mode (for example diversity of spatial multiplexing) 950, a RS structure (random sequence initialization and antenna port number and/or index) 952, a reception beam (for example a beam index and respective time unit) 954 and a Control channel multiplexing flag (for example, a single bit defining whether there is multiplexing or not) 956.

There may be additional parameters to those of FIG. 8, or parameters not found in FIG. 8, as these parameters are merely examples of possible parameters. In other implementations, a select subset of the parameters shown in list 940 may make up a configuration set of parameters, or a group of any of these parameters and other additional parameters, may make up a configuration set of parameters.

When receiving a control message, whether the message has repetition or not, the search space(s) associated with the same control resource set may be different, at least with respect to one of candidate number and aggregation level. This means that for a case in which repetition is used, it may not be necessary to use low aggregation level transmission.

Within one control resource set, at most one instance can be transmitted.

Table 1 below shows an example of the number of downlink control channel candidates that are used for transmission without repetition for two different parameter configuration sets (set1 and set2) for four different aggregation levels, L=1, L=2, L=4 and L=8. The pair of numbers for each aggregation level represents the number of candidates that could be used for transmit occurrences for each respective parameter set.

TABLE 1

| | | Number of NR-PDCCH candidates without repetition | | | |
|---|---|---|---|---|---|
| | | L = 1 | L = 2 | L = 4 | L = 8 |
| set1 | set2 | 1, 1 | 1, 1 | 4, 4 | 2, 2 |

Table 2 below shows an example of the number of downlink control channel candidates that are used for transmission with repetition for two different parameter configuration sets (set1 and set2) for four different aggregation levels, L=1, L=2, L=4 and L=8. The pair of numbers for each aggregation level represents the number of candidates that could be used for transmit occurrences for each respective parameter set.

TABLE 2

| | | Number of NR-PDCCH candidates with repetition | | | |
|---|---|---|---|---|---|
| | | L = 1 | L = 2 | L = 4 | L = 8 |
| set1 | set2 | 0, 0 | 0, 0 | 4, 4 | 2, 2 |

Figure 10:
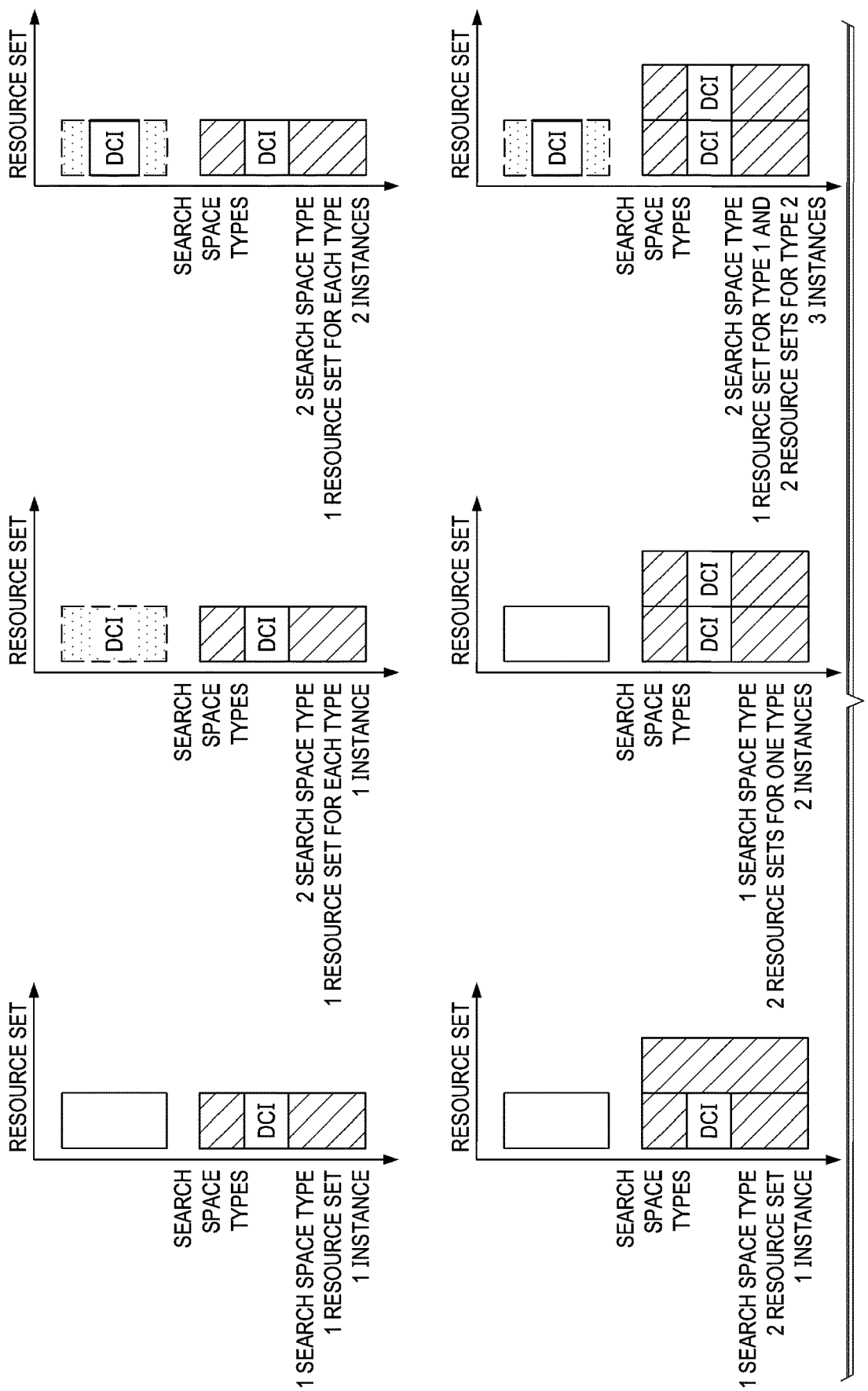
FIG. 10 is a group of examples illustrating the relationship between search space type, control resource set and instances of transmission by the network.

FIG. 10 illustrates six examples of configurations for transmission to a UE by the network based on the variables of search space type, control resource set for each type and number of instances of transmission. Each of the six examples illustrate a transmission resource in which the search space type increases in a vertical direction and a control resource set increases in a horizontal direction. In (a) there is a single search space type being used (of a group of possible search space types) having a single control resource set for transmission of a single instance. In (b) there are two search space types each having a single control resource set for transmission of a same single instance. In (c) there are two search space types each having a single control resource set for transmission of a respective single instance, i.e. two instances in total. In (d) there is a single search space type having two control resource sets for transmission of a single instance. In (e) there is a single search space type each having two control resource sets each for transmission of a respective single instance, i.e. two instances in total. In (f) there are two single search space types, a first search space type having one control resource set for transmission of a single instance and a second search space type having two control resource sets each for transmission of a respective single instance, i.e. three instances in total.

Figure 11:
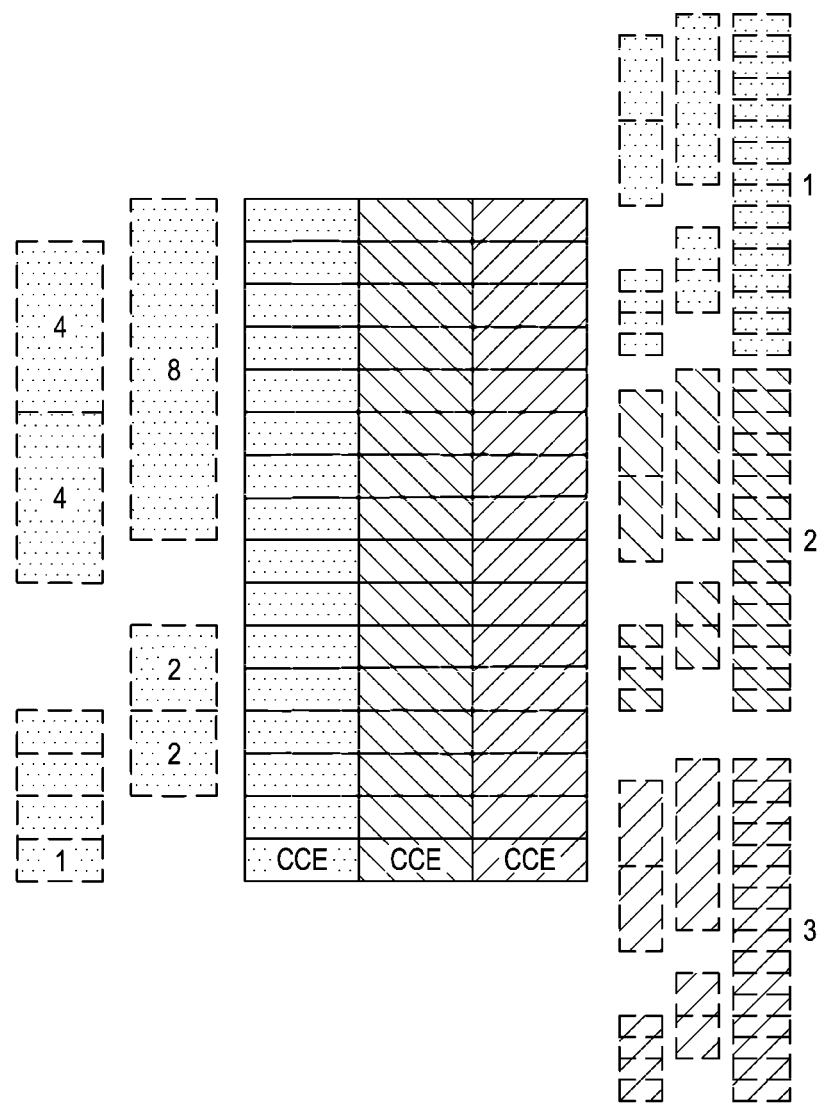
FIG. 11 is a block diagram illustrating associations for control resource sets of a transmission resource for a given search space type in a Time Division Multiplexing (TDM) embodiment and a Frequency Division Multiplexing (FDM) embodiments.

FIG. 11 illustrates examples of three control resource sets in (a) a time division multiplexing (TDM) format associated with one search space type and three control resource sets in (b) a frequency division multiplexing (FDM) format associated with one search space type.

Figure 12A:
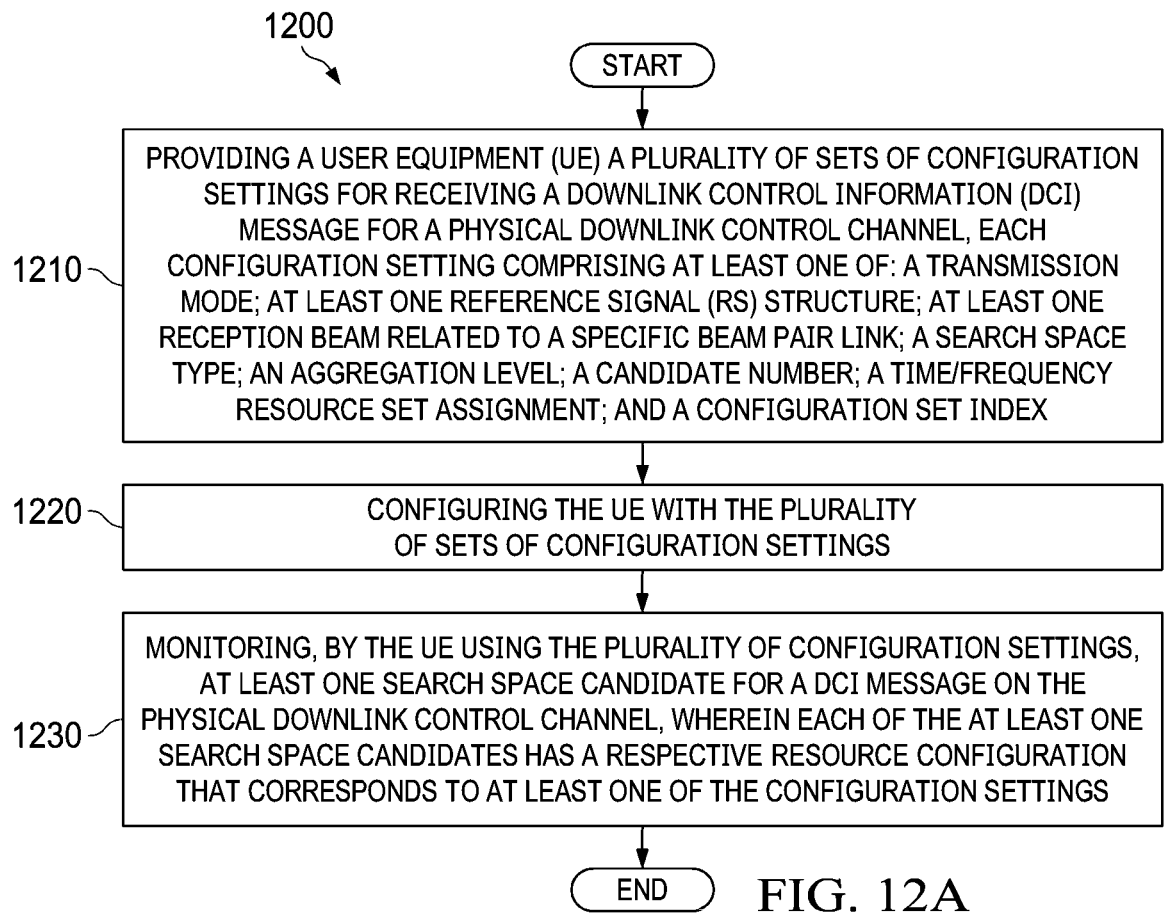
FIG. 12A is a flow chart describing a method for configuring a UE with multiple configuration settings according an embodiment of the disclosure.

FIG. 12A is a flow chart that illustrates a method 1200 for configuring a UE from the perspective of the UE. The method involves in step 1210 providing the UE a plurality of configuration settings for receiving a downlink control information (DCI) message for a physical downlink control channel. Each configuration setting defines at least one parameter, wherein the at least one parameter in each configuration setting includes at least one of: a transmission mode; at least one reference signal (RS) structure; at least one reception beam related to a specific beam pair link; a search space type; an aggregation level; a candidate number; a time/frequency resource set assignment; and a configuration set index. In step 1220, the UE is configured with the plurality of sets of configuration settings. One or more of the configuration settings (e.g., search space type, aggregation level, candidate number, etc.) may be identified via explicit signaling, e.g., RRC signaling, etc. Step 1230 involves monitoring, by the UE using the plurality of configuration settings, at least one search space type for a specific DCI message, wherein each of the at least one search space type is associated with respective transmission and/or reception parameters that corresponds to at least one of the configuration settings.

Figure 12B:
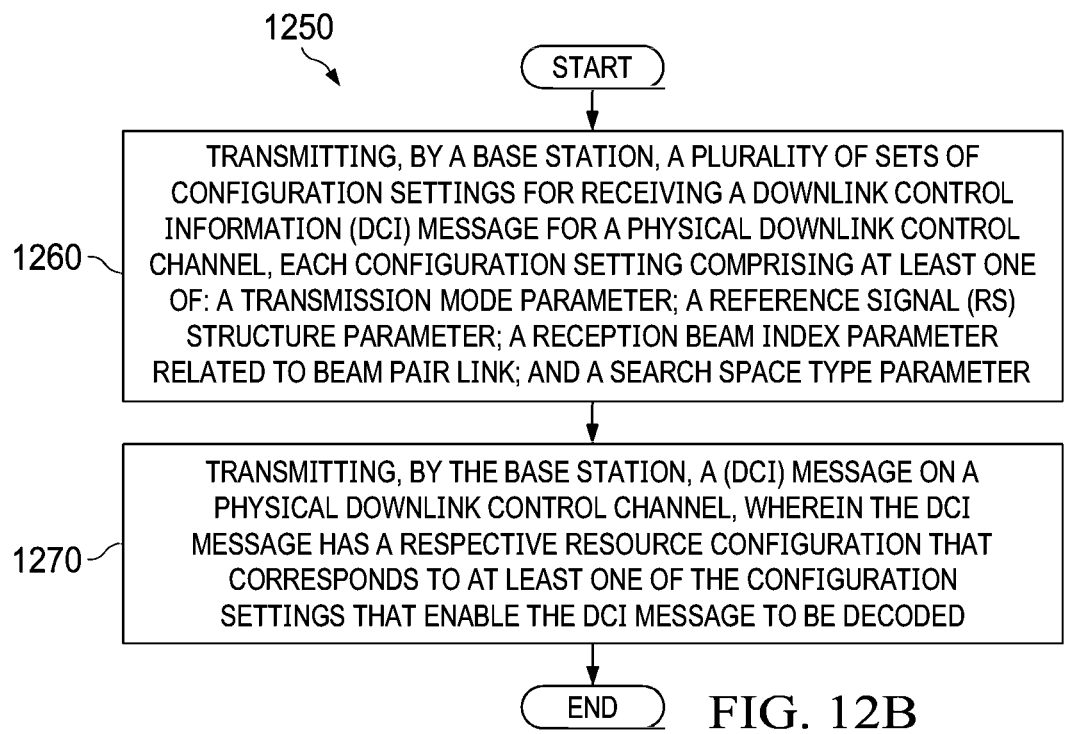
FIG. 12B is a flow chart describing another method for configuring a UE with multiple configuration settings according an embodiment of the disclosure.

FIG. 12B is a flow chart that illustrates a method 1250 for configuring a UE from the perspective of the base station. Step 1260 includes transmitting, by the base station, a plurality of configuration settings for receiving DCI message for a physical downlink control channel. Each configuration setting defines at least one parameter, wherein the at least one parameter in each configuration setting includes at least one of: a transmission mode; at least one reference signal (RS) structure; at least one reception beam index related to beam pair link; a search space type; an aggregation level; a candidate number; a time/frequency resource set assignment; and a configuration set index. Step 1270, includes transmitting, by the base station, a DCI message on a physical downlink control channel, wherein the DCI message has respective transmission and/or reception parameters that corresponds to at least one of the configuration settings that enable the DCI message to be decoded.

Figure 13:
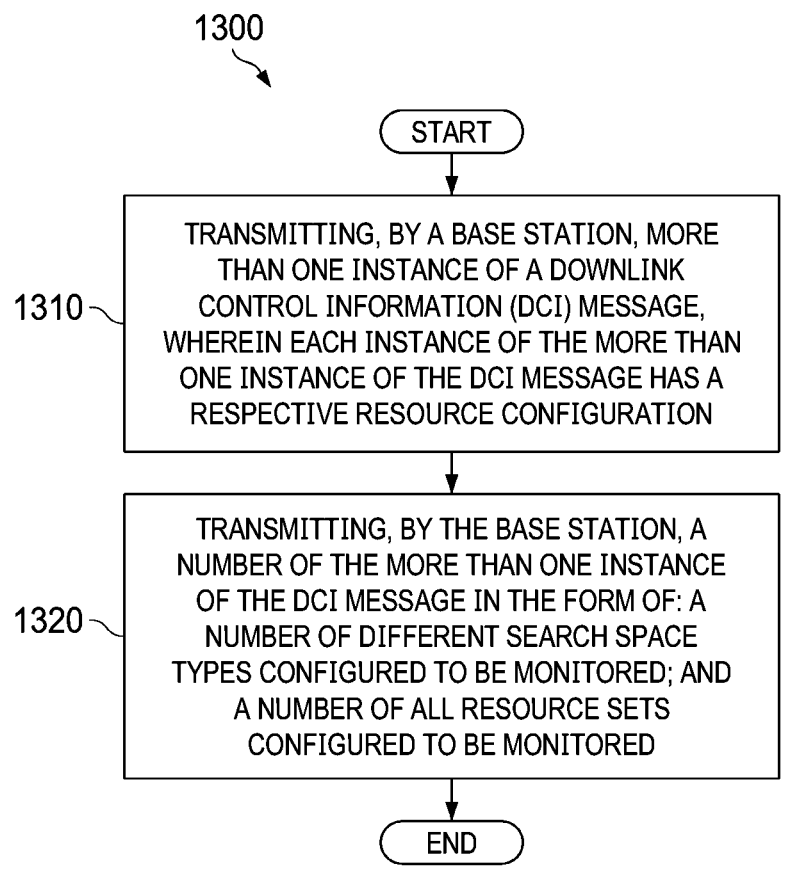
FIG. 13 is a flow chart describing a method for configuring a UE for receiving more than one instance of a DCI message according an embodiment of the disclosure.

FIG. 13 is a flow chart that illustrates a method 1300 for configuring a UE from the perspective of the base station. Step 1310 involves transmitting, by the base station, more than one instance of a downlink control information DCI message, wherein each instance of the more than one instance of the DCI message has a respective resource configuration. Step 1320 involves transmitting, by the base station, a number of the more than one instance of the DCI message in the form of at least one of: a number of different search space types configured to be monitored; and a number of all control resource sets configured to be monitored.

Figure 14:
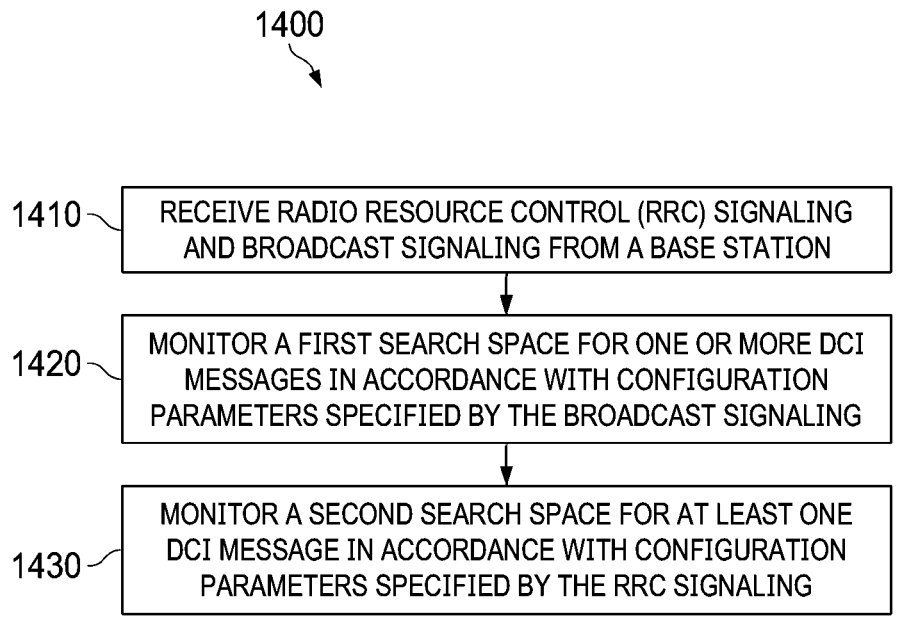
FIG. 14 is a flow chart of an embodiment method for monitoring search spaces.

FIG. 14 is a flowchart of an embodiment method 1400 for monitoring search spaces, as may be performed by a UE. At step 1410, the UE receives radio resource control (RRC) signaling and broadcast signaling from a base station. At step 1420, the UE monitors a first search space for one or more DCI messages in accordance with configuration parameters specified by the broadcast signaling. At step 1430, the UE monitors a second search space for at least one DCI message in accordance with configuration parameters specified by the RRC signaling. The second search space is a different type of search space than the first search space. In one embodiment, the first search space is a common search space and the second search space is a UE-specific search space.

Figure 15:
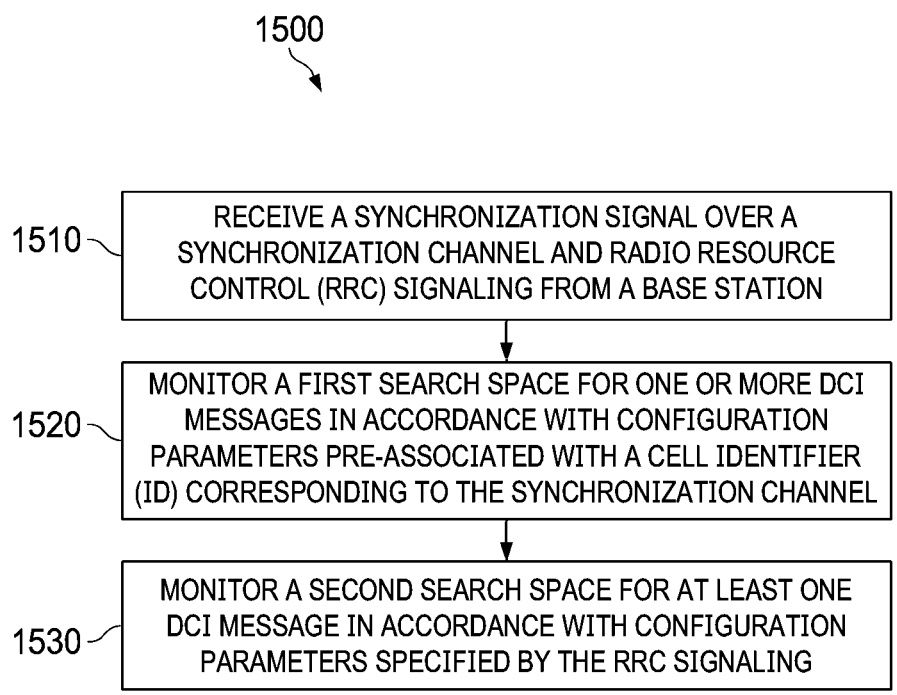
FIG. 15 is a flow chart of another embodiment method for monitoring search spaces.

FIG. 15 is a flowchart of an embodiment method 1500 for monitoring search spaces, as may be performed by a UE. At step 1510, the UE receives a synchronization channel and radio resource control (RRC) signaling from a base station. At step 1520, the UE monitors a first search space for one or more DCI messages in accordance with configuration parameters pre-associated with a cell identifier (ID) corresponding to the synchronization channel. At step 1530, the UE monitors a second search space for at least one DCI message in accordance with configuration parameters specified by the RRC signaling. The second search space is a different type of search space than the first search space. In one embodiment, the first search space is a common search space and the second search space is a UE-specific search space.

Figure 16:
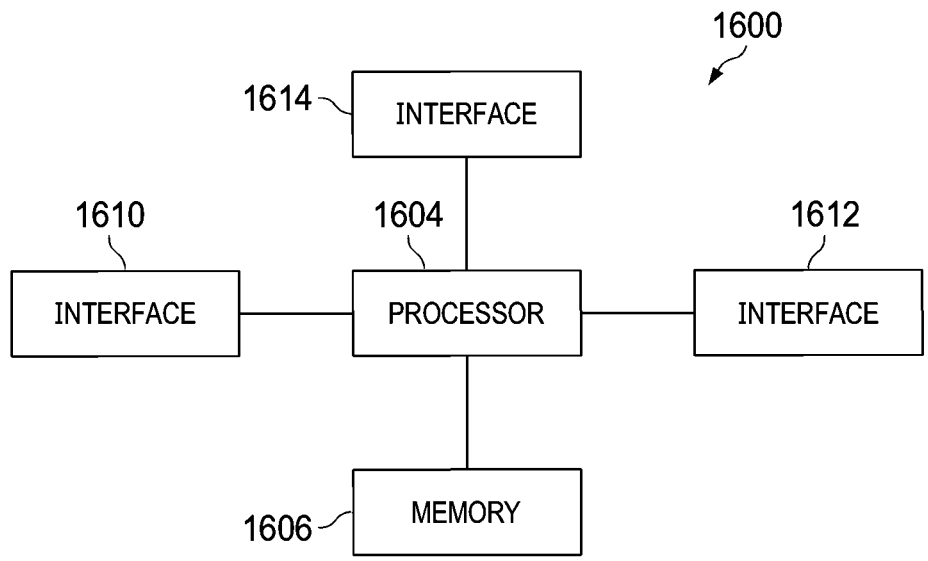
FIG. 16 is a block diagram of an embodiment processing system for performing methods described herein.

FIG. 16 illustrates a block diagram of an embodiment processing system 1600 for performing methods described herein, which may be installed in a host device. As shown, the processing system 1600 includes a processor 1604, a memory 1606, and interfaces 1610-1614. The processor 1604 may be any component or collection of components adapted to perform computations and/or other processing related tasks, and the memory 1606 may be any component or collection of components adapted to store programming and/or instructions for execution by the processor 1604. A means for configuring a context for a UE may include processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
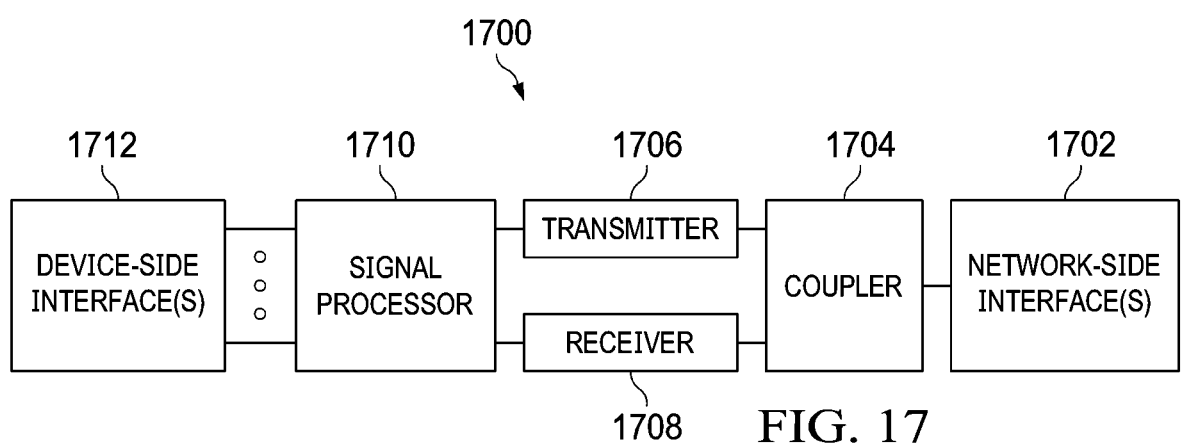
FIG. 17 is a block diagram of a transceiver adapted to transmit and receive signaling over a telecommunications network according to example embodiments described herein.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The network-side interface 1702 may also include any component or collection of components adapted to transmit or receive signaling over a short-range interface. The network-side interface 1702 may also include any component or collection of components adapted to transmit or receive signaling over a Uu interface. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. A means for transmitting an initial message of an access procedure may include transmitter 1706. The receiver 1708 may include any component or collection of components (e.g., down-converter, low noise amplifier, etc.) adapted to convert a carrier signal received over the network-side interface 1702 into a baseband signal. A means for receiving mobile subscriber identifiers, initial downlink messages of access procedures, and forwarded requests to connect to a network may include receiver 1708.

The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While aspects of this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

The invention claimed is:

1. A method comprising:
   transmitting, by a base station to a user equipment (UE), a single radio resource control (RRC) message, wherein the single RRC message includes first configuration parameters and second configuration parameters, and wherein the single RRC message comprises a linkage between the first configuration parameters and the second configuration parameters;
   transmitting, by the base station to the UE, a first downlink control information (DCI) in a first physical downlink control channel (PDCCH) search space in accordance with the first configuration parameters; and
   transmitting, by the base station to the UE, a second DCI in a second PDCCH search space in accordance with the second configuration parameters, the first PDCCH search space and the second PDCCH search space being associated with different control resource sets, wherein the first DCI and the second DCI are associated with a same UE identifier (ID), and wherein the first PDCCH search space and the second PDCCH search space are different UE-specific search spaces.

2. The method of claim 1, wherein the single RRC message is a UE-specific RRC message.

3. The method of claim 1, wherein the single RRC message comprises different random sequence initialization numbers for the first configuration parameters and the second configuration parameters.

4. The method of claim 3,
   wherein the single RRC message comprises a first random sequence initialization number and a second random sequence initialization number,
   wherein the transmitting, by the base station to the UE, the first DCI comprises transmitting the first DCI using the first random sequence initialization number, and
   wherein the transmitting, by the base station to the UE, the second DCI comprises transmitting the second DCI using the second random sequence initialization number.

5. The method of claim 1,
   wherein the first configuration parameters comprise a first indication of a first reception beam index and the second configuration parameters comprise a second indication of a second reception beam index, and
   wherein the transmitting, by the base station to the UE, the first DCI in the first PDCCH comprises transmitting the first PDCCH carrying the first DCI according to the first reception beam index, and
   wherein the transmitting, by the base station, to the UE, the second DCI comprises transmitting the second DCI according to the second reception beam index.

6. The method of claim 1, wherein the UE ID comprises a radio network temporary identifier (RNTI).

7. The method of claim 1, wherein the first PDCCH search space and the second PDCCH search space overlap in the time domain.

8. The method of claim 1, wherein the second DCI is different than the first DCI, or the first DCI and the second DCI are different instances of a single DCI.

9. The method of claim 8, wherein the first PDCCH and the second PDCCH follows time division multiplexing or frequency division multiplexing.

10. The method of claim 1, wherein the first configuration parameters and the second configuration parameters each comprises at least one of a search space type, one or more aggregation levels, or a candidate number.

11. A method comprising:
receiving, by a user equipment (UE) from a base station, a single radio resource control (RRC) message, wherein the single RRC message includes first configuration parameters and second configuration parameters, and wherein the single RRC message comprises a linkage between the first configuration parameters and the second configuration parameters;
receiving, by the UE from the base station, a first downlink control information (DCI) in a first physical downlink control channel (PDCCH) search space in accordance with the first configuration parameters; and
receiving, by the UE from the base station, a second DCI in a second PDCCH search space in accordance with the second configuration parameters, the first PDCCH search space and the second PDCCH search space being associated with different control resource sets, wherein the first DCI and the second DCI are associated with a same UE identifier (ID), and wherein the first PDCCH search space and the second PDCCH search space are different UE-specific search spaces.

12. The method of claim 11, wherein the single RRC message comprises different random sequence initialization numbers for the first configuration parameters and the second configuration parameters.

13. The method of claim 12,
wherein the single RRC message comprises a first random sequence initialization number and a second random sequence initialization number,
wherein the receiving, by the UE from the base station, the first DCI comprises receiving the first DCI using the first random sequence initialization number, and
wherein the receiving, by the UE from the base station, the second DCI comprises receiving the second DCI using the second random sequence initialization number.

14. The method of claim 11,
wherein the first configuration parameters comprise a first indication of a first reception beam index and the second configuration parameters comprise a second indication of a second reception beam index,
wherein the receiving, by the UE from the base station, the first DCI in the first PDCCH comprises receiving the first PDCCH carrying the first DCI according to the first reception beam index, and
wherein the receiving, by the UE from the base station, the second DCI comprises receiving the second DCI according to the second reception beam index.

15. The method of claim 11, wherein the second DCI is different than the first DCI, or the first DCI and the second DCI are different instances of a single DCI.

16. The method of claim 15, wherein the first PDCCH and the second PDCCH follows time division multiplexing or frequency division multiplexing.

17. The method of claim 11, wherein the first configuration parameters and the second configuration parameters each comprises at least one of a search space type, one or more aggregation levels, or a candidate number.

18. An apparatus comprising:
at least one processor;
a non-transitory computer-readable storage medium coupled with the at least one processor, the non-transitory computer-readable storage medium storing instructions that, when executed by the at least one processor, cause the apparatus to perform operations including:
transmitting, to a user equipment (UE), a single radio resource control (RRC) message, wherein the single RRC message includes first configuration parameters and second configuration parameters, and wherein the single RRC message comprises a linkage between the first configuration parameters and the second configuration parameters;
transmitting, to the UE, a first downlink control information (DCI) in a first physical downlink control channel (PDCCH) search space in accordance with the first configuration parameters; and
transmitting, to the UE, a second DCI in a second PDCCH search space in accordance with the second configuration parameters, the first PDCCH search space and the second PDCCH search space being associated with different control resource sets, wherein the first DCI and the second DCI are associated with a same UE identifier (ID), and wherein the first PDCCH search space and the second PDCCH search space are different UE-specific search spaces.

19. The apparatus of claim 18, wherein the single RRC message is a UE-specific RRC message.

20. The apparatus of claim 18, wherein the single RRC message comprises different random sequence initialization numbers for the first configuration parameters and the second configuration parameters.

* * * * *